United States Patent
Sohn

(10) Patent No.: US 11,387,704 B2
(45) Date of Patent: Jul. 12, 2022

(54) PORTABLE PRIVATE POWER GENERATION APPARATUS AND MODULE EQUIPPED WITH SAME

(71) Applicant: N-RIT Co., Ltd., Paju-si (KR)

(72) Inventor: Dae Up Sohn, Paju-si (KR)

(73) Assignee: N-RIT Co., Ltd., Paju-si (KR)

( * ) Notice: Subject to any disclaimer, the term of this patent is extended or adjusted under 35 U.S.C. 154(b) by 381 days.

(21) Appl. No.: 16/478,612

(22) PCT Filed: Jan. 8, 2018

(86) PCT No.: PCT/KR2018/000328
§ 371 (c)(1),
(2) Date: Jul. 17, 2019

(87) PCT Pub. No.: WO2018/135789
PCT Pub. Date: Jul. 26, 2018

(65) Prior Publication Data
US 2020/0052549 A1  Feb. 13, 2020

(30) Foreign Application Priority Data
Jan. 20, 2017  (KR) .................... 10-2017-0010046

(51) Int. Cl.
*H02K 7/02* (2006.01)
*F03G 5/06* (2006.01)
(Continued)

(52) U.S. Cl.
CPC .............. *H02K 7/025* (2013.01); *F03G 5/06* (2013.01); *F16F 15/30* (2013.01); *H02J 7/1415* (2013.01)

(58) Field of Classification Search
CPC .... H02K 7/116; H02K 7/1861; H02K 7/1853; H02K 7/025; H02J 7/1415; F16F 15/30; F03G 5/06
(Continued)

(56) References Cited

U.S. PATENT DOCUMENTS 6,227,803 B1 * 5/2001 Shim .................... F03D 7/0236
416/44
8,013,457 B2  9/2011 Bulthaup et al.
(Continued)

FOREIGN PATENT DOCUMENTS

CN        1683785 A      10/2005
JP     2003-129929 A      5/2003
(Continued)

OTHER PUBLICATIONS

WO 2016/005584 A1—MACHINE Translation -Leis, Franz (Inv)—Dynamo System for Trekking Activities (Year: 2016).*
(Continued)

*Primary Examiner* — Bickey Dhakal
*Assistant Examiner* — Gabriel Agared
(74) *Attorney, Agent, or Firm* — Novick, Kim & Lee, PLLC; Jae Youn Kim

(57) ABSTRACT

Disclosed are a portable private power generation apparatus, and a module equipped with same, the portable private power generation apparatus being small in size, and capable of efficiently generating private power to charge a battery, and able to be linked and used with a variety of smart modules when customary power cannot be supplied in times of emergencies such as during military operations, in refugee camps, during disasters due to earthquakes and the like, emergency situations on ships, and outdoor activities. The present invention comprises: a rotatable fly-wheel member; first and second rotating members for rotating the fly-wheel member; first and second wires for rotating the first and second rotating members, respectively, by means of a pulling action; first and second spring members for carrying out winding actions of the respective first and second wires; and a power generation member for generating power from the rotation of the fly-wheel member. As such, a user can generate power continuously for an extended amount of time by repeating the action of pulling the wires with one or both hands.

16 Claims, 11 Drawing Sheets

(51) Int. Cl.
*F16F 15/30* (2006.01)
*H02J 7/14* (2006.01)

(58) Field of Classification Search
USPC .......................................................... 318/150
See application file for complete search history.

(56) References Cited

U.S. PATENT DOCUMENTS

| | | | | |
|---|---|---|---|---|
| 2001/0006052 | A1* | 7/2001 | Gracyalny | F02N 5/02 |
| | | | | 123/185.14 |
| 2006/0279085 | A1* | 12/2006 | Lee | H02J 7/32 |
| | | | | 290/1 E |
| 2007/0227470 | A1 | 10/2007 | Cole et al. | |
| 2010/0283249 | A1* | 11/2010 | Harden | F03B 13/141 |
| | | | | 290/53 |
| 2012/0011960 | A1* | 1/2012 | Van de Ven | F16F 15/31 |
| | | | | 74/573.1 |
| 2012/0192784 | A1* | 8/2012 | Gimlan | B60L 50/20 |
| | | | | 116/200 |

FOREIGN PATENT DOCUMENTS

| | | |
|---|---|---|
| KR | 10-2010-0120967 A | 11/2010 |
| KR | 10-2013-0068347 A | 6/2013 |
| KR | 10-1312055 B1 | 9/2013 |
| KR | 10-2015-0130955 A | 11/2015 |
| KR | 10-1596430 B1 | 2/2016 |

OTHER PUBLICATIONS

Lee, Ji-Young et al., Design of an Axial Flux Permanent Magnet Generator for a Portable Hand Crank Generating System, IEEE Transactions on Magnetics, vol. 48, issue 11, pp. 2977-2980.

* cited by examiner

PORTABLE PRIVATE POWER GENERATION APPARATUS AND MODULE EQUIPPED WITH SAME

TECHNICAL FIELD

The present invention relates to a portable private power generation apparatus and a module equipped with same, and more particularly, to a portable private power generation apparatus, which is manufactured in a small size, is coupled to a variety of smart modules for use and generates private power at high efficiency to charge a battery in a time of emergency when general power is not supplied, such as during military operations, in refugee camps, during disasters due to earthquakes or the like, in emergency situations on ships, during outdoor activities, and the like, and a module equipped with same.

BACKGROUND ART

Generally, electricity is used as a major energy source in industrial society, but due to depletion of fossil energy, investment and development for various alternative power generation facilities, such as solar power generation, wind power generation, tidal power generation, and the like, are rapidly progressing. Meanwhile, electricity generated from power generation facilities is supplied to household devices or products and industrial devices or products through power cables and is used as an energy source, but most products that require portability or activity, such as small home appliances and household items, are equipped with batteries, such as a primary battery or a secondary battery, that is used as power supplies.

In addition, as societies become more sophisticated, various electronic devices are being developed, and the number of people who use the electronic devices is increasing day by day. Recently, use of portable electronic devices, such as smart phones, has been increasing. Further, since, due to the development of outdoor leisure culture, such as fishing, mountain climbing, and the like, time spent outdoors is increasing, spare batteries are being used.

However, since batteries are limited in use time thereof, the batteries should be recharged when power is discharged, but there is a problem that the batteries cannot be charged while on the move or outdoors. In addition, there are problems that communications for rescue requests, electrical devices for lighting, smartphones, tablet PCs, laptops, and the like are not operable in a time of emergency when general power is not supplied, and batteries run low such as during military operations, in refugee camps, during disasters due to earthquakes and the like, in emergency situations on ships, and the like.

Therefore, recently, portable private power generation apparatuses that secure electrical energy that is consumed in various electronic devices used for outdoor activities, such as military operations, fishing, mountain climbing, and the like, through private power generation and use required power during an emergency, are proposed and used. When electrical energy is generated, since the conventional portable private power generation apparatuses perform separate operations, such as a specific operation (rotation of a lever) and the like, the amount of energy that can be obtained is very small while the devices are inconvenient to use and consume a large amount of time, and therefore, there is a problem that the conventional portable private power generation apparatuses are not applied to actual electrical devices.

An example of technology for solving the problems is disclosed in the below document.

For example, as shown in FIG. 1, a gear-driving apparatus for self-powered generation by forward and reverse rotation is disclosed in Korean Patent Registration No. 10-1178592 (Registered on Aug. 24, 2012, Patent Document 1), wherein the gear-driving apparatus for private power generation by forward and reverse rotation includes a power generation part 30 that includes a rotator 32 and an electric induction body 38 and a gear driving part 10 that rotates the rotator 32 in only a forward direction, wherein, in the gear driving part 10, a driving pulley 6 is formed on a driving shaft 8 of the gear driving part 10 and is rotated by forward operation of a pedal, a first driving gear 12 linked with the driving pulley 6 is axially coupled with a second driving gear 14 linked with the driving pulley 6, the first driving gear 12 and the second driving gear 14 are linked and driven together by a plurality of gears, the driving pulley 6 and the second driving gear 14 include clutch bearings 6a and 14a installed therein and alternately transfer a rotational force in only a forward direction, a rotational resistance generated between the electric induction body 38 and the rotator 32, which is rotated by the driving shaft 8, is transferred to the driving pulley 6, and thus the gear-driving apparatus for self-powered generation by forward and reverse rotation has a kinetic load when a pedal is driven.

Further, a private power generation apparatus is disclosed in Korean Patent Registration No. 10-1596430 (Registered on Feb. 16, 2016, Patent Document 2) which is filed and registered by an inventor, wherein the private power generating apparatus includes a driving shaft that is alternately rotated by an external force in forward and reverse directions, a forward power transfer part that transfers only a forward rotational force of the driving shaft to a power generation shaft, a reverse power transfer part that transfers only a reverse rotational force of the driving shaft to the power generation shaft, and a generator that generates power using a unidirectional rotational force of the power generation shaft, wherein, since a pulley is axially coupled with the driving shaft and a wire wound around the pulley of the driving shaft alternately reciprocates, the driving shaft alternately rotates in forward and reverse directions.

Further, a bidirectional power transfer device is disclosed in Chinese Patent Publication CN 1683785A (Published on Oct. 19, 2005, Patent Document 3), wherein the bidirectional power transfer device includes a power input device, a unidirectional driving part, and a power output device, wherein the power input device constantly transmits a reciprocating force in two opposite directions to the unidirectional driving part, the unidirectional transfer member may be a unidirectional driven power output device, a unidirectional driving unit allows a movement direction of the power output device to correspond to transmission power while power transfer is not performed in a reverse direction, and two unidirectional transfer elements, which refer to a power input device for two unidirectional transfer members, drive the power output device according to setting for a movement direction.

Further, an attraction generation apparatus is disclosed in US patent publication U.S. Pat. No. 8,013,457 (Registered on Sep. 6, 2011, Patent Document 4), wherein the attraction generation apparatus has, as a structure that generates power using a wire that is wound around a bobbin and reciprocates, a structure that allows generated energy to be simultaneously output and stored in an energy source when the wire is pulled, allows the energy to be output from the energy source when the wire is loosened, and uses one clutch to rotate a rotator in one direction so as to generate power by relative rotation with a stator, and thus a rotational force in only one direction generates power.

Further, a portable private power generation system is disclosed in Design of an Axial Flux Permanent Magnet Generator for a Portable Hand Crank Generating System (Lee, Ji-Young; Koo, Dae-Hyun; Moon, Seung-Ryul; Han, Choong-Kyu IEEE Transactions on Magnetics, vol. 48, issue 11, pp. 2977-2980: Non-patent Document 1), wherein the portable private power generation system includes a crank-device part for performing unidirectional rotation with a user's hand, a speed-increasing gear part that considers improvement of overall system efficiency and noise reduction, a power generation part to which an axial flux-type brushless generator design technique is applied, and a charge/power conversion part that is chargeable at a speed greater than a minimum speed (32 rotations per minute by a crank) even when the portable private power generation system is driven by a user at an irregular speed so that input is changed.

DISCLOSURE

Technical Problem

However, since a private power generation apparatus described above in Patent Document 1 is fixed and installed in one place, like a treadmill, a lat pulldown, a pendulum exercise machine, and the like, portability for outdoor use, such as military operations and the like, is low, and thus there is a problem that power generation is not performed when necessary while a user carries the private power generation apparatus around.

In technology disclosed in Patent Document 2, which is a private power generation apparatus, there are problems that components may be damaged by repeated use for a long time, and when a wire wound around a pulley is loosened, the private power generation apparatus cannot be operated.

Further, in technology disclosed in Patent Document 3, which is a bidirectional power transfer device, a rotational speed is increased through a plurality of speed-increasing gears due to a short stroke (a movement distance) and a small driving force, but there are problems that the configuration of the device is complicated, and energy for power generation is consumed due to a multi-stage connection structure.

Further, in a technology disclosed in Patent Document 4, which is an attraction generation apparatus, since the attraction generation apparatus has a structure that stores only a rotational force, which is generated when a wire is pulled, in an energy source and consumes energy of an energy source when the wire is loosened, sufficient power is not generated, and thus a battery cannot be charged.

Further, in technology disclosed in Non-patent Document 1, since a crank-device part should be rotated in one direction while a user performs a power generation process, energy consumption is increased so that the user is tired, and thus there is a problem that power generation cannot be continuously performed for a relatively long time.

The present invention is directed to providing a portable private power generation apparatus which allows a user to continuously generate power with one hand or two hands or one foot or both feet for a long time outdoors, such as during military operations, in refugee camps, during disasters due to earthquakes and the like, in emergency situations on ships, fishing, mountain climbing, and the like, so as to charge a battery, and a module equipped with the same.

In addition, the present invention is directed to providing a portable private power generation apparatus that is manufactured in a small size and generates power at high efficiency, and a module equipped with the same.

Further, the present invention is directed to providing a portable private power generation apparatus which includes first and second rotating members and first and second wires to continuously generate power even when a failure occurs on either side of first and second rotating members and first and second wires, and a module equipped with the same.

Furthermore, the present invention is directed to providing a portable private power generation apparatus which includes a first rotating member and a second rotating member that are manufactured as identical components, a first wire and a second wire that are manufactured as identical components, and a first spring member and a second spring member that are designed and manufactured as identical components so as to reduce costs for manufacturing the power generation apparatus, and a module equipped with the same.

In addition, the present invention is directed to providing a portable private power generation apparatus which is coupled with a smart module, such as an insect/mosquito repellent device, an emergency light, a rescue signal apparatus, or the like, and is used outdoors, and a module equipped with the same.

Further, the present invention is directed to providing a portable private power generation apparatus which generates power and also promotes a user's workout, and a module equipped with the same.

Technical Solution

One aspect of the present invention provides a portable private power generation apparatus which includes a fly-wheel member which is rotatable, a first rotating member and a second rotating member that rotate the fly-wheel member, a first wire and a second wire that each rotate the first and second rotating members by a pulling operation, a first spring member and a second spring member that perform a winding operation on the first and second wires, respectively, and a power generation member that generates power according to rotation of the fly-wheel member.

The fly-wheel member may rotate in only one direction, and the first and second rotating members may be insertion-coupled to left and right portions or upper and lower portions of the fly-wheel member, respectively.

The fly-wheel member may include a fly-wheel main body that includes a ring gear provided on an outer circumference thereof and a first clutch gear provided on an inner side thereof, a fly-wheel support inserted into the fly-wheel main body, and a fly-wheel that is coupled to the fly-wheel support and includes a second clutch gear provided on an inner side thereof.

Each of the first and second rotating members may include a reel that maintains a wound state of the wire and is rotatable according to pulling or winding of the wire, a spring cover that is insertion-coupled to the reel and includes the spring member embedded therein, a locking plate mounted on the spring cover, and a locking member that is mounted on the locking plate and is insertion-coupled to the first clutch gear of the fly-wheel main body or the second clutch gear of the fly-wheel so that the fly-wheel member rotates in one direction.

Each of the first and second spring members may include a spiral spring embedded in the spring cover and a spring holder into which an end portion of a shaft is inserted, one inner end portion of the spiral spring may be inserted into the spring holder, and one outer end portion of the spiral spring may be inserted into the spring cover.

A plurality of protrusions may be provided on an inner side of the reel, a plurality of grooves may be provided on an outer side of the spring cover, and each of the plurality of protrusions may be inserted into one of the plurality of grooves to be integrally rotatable.

An insertion part into which the one outer end portion of the spiral spring is inserted may be provided on a circumference of the spring cover, and a seating part on which the one outer end portion of the spiral spring, which is inserted through the insertion part, is seated may be provided on an outer side of the spring cover.

The portable private power generation apparatus further includes a cover member that accommodates the fly-wheel member, the first and second rotating members, the first and second wires, and the first and second spring members, wherein the cover member includes an upper cover and a lower cover that are separable.

The spring holder may include a protrusion, wherein the protrusion is inserted into a concave part provided in the cover member to block rotation of the spring holder.

The power generation member may include a motor, a gear provided in a rotating shaft of the motor and engaged with the ring gear of the fly-wheel main body, and a motor bracket configured to mount the motor on the cover member.

The fly-wheel support may be inserted into a central portion of the shaft, and the fly-wheel support may be rotatably held on the shaft by an E-ring insertion-coupled to the shaft.

A pulling state of the wire may be controlled by an elastic force of the spiral spring.

The locking plate may include a support protrusion that supports rotation of the locking member, the locking member may be provided as a pair of locking members around the support protrusion, and the locking member may be insertion-coupled to the first clutch gear or the second clutch gear on the same plane as the fly-wheel main body or the fly-wheel.

The first rotating member, the first wire, and the first spring member may be operated independently from the second rotating member, the second wire, and the second spring member.

Another aspect of the present invention provides a module equipped with the portable private power generation apparatus according to the present invention which includes a portable private power generation apparatus, a main body that accommodates the portable private power generation apparatus, a bottom member that is coupled to the main body and fixes the portable private power generation apparatus, and a first handle and a second handle that are coupled to the first and second wires, respectively.

The module may further include at least one of a battery that is mounted in the main body and charges electricity generated by the power generation apparatus, a light emitting device connected to the battery, and a Universal Serial Bus (USB) terminal connected to the battery.

A screw-coupled structure may be provided on an upper portion of the main body, and the main body may be coupled to at least one of an insect/mosquito repellent device module, an emergency light module, a rescue signal apparatus module, a heater module, a cooler module, and the like that are coupled in a screw-coupling manner.

Advantageous Effects

A portable private power generation apparatus and a module equipped with the same according to the present invention includes a fly-wheel member which is rotatable in one direction, a first rotating member and a second rotating member that rotate the fly-wheel member, and a first wire and a second wire that each rotate the first and second rotating members by a pulling operation to allow a user to repeatedly pull wires with one hand or two hands so as to continuously generate a large amount of power at high efficiency for a long time in a relatively comfortable state.

Further, in the portable private power generation apparatus and the module equipped with the same according to the present invention, the first and second rotating members in which the first and second spring members are embedded are insertion-coupled to the left and right portions or upper and lower portions of the fly-wheel member, and thus the portable private power generation apparatus can be manufactured in a small size.

Further, in the portable private power generation apparatus and the module equipped with the same according to the present invention, a locking member is inserted into the fly-wheel member to prevent the locking member from coming out, and the spring member is embedded in the rotating member to prevent components from being damaged.

Further, in the portable private power generation apparatus and the module equipped with the same according to the present invention, the first and second rotating members and the first and second wires are provided, and thus, even when any one of the rotating members and wires are damaged when used for a long time, private power generation can be performed continuously using the other one of the rotating members and the wires.

Further, in the portable private power generation apparatus and the module equipped with the same according to the present invention, the first and second rotating members are manufactured as identical components, the first and second wires are manufactured as identical components, and further, and the first and second spring members are manufactured as identical components, and thus costs for designing and manufacturing components can be reduced, and costs for manufacturing the private power generation apparatus can be reduced.

Further, in the portable private power generation apparatus and the module equipped with the same according to the present invention, the main body is coupled to an insect/mosquito repellent device module, an emergency light module, a rescue signal apparatus module, a heater module, a cooler module, and the like, and thus expansion of the electrical device can be promoted.

Further, when a pulling wire (a wire) is pulled for operation by the portable private power generation apparatus and the module equipped with the same according to the present invention, a predetermined repulsive force is generated so that an effect of workout occurs when the pulling wire is pulled with a force greater than the repulsive force, and how much a user has exercised is displayed according to power generation by operations of the first and second handles, and thus health of the user can be promoted.

MODES OF THE INVENTION

Figure 1:
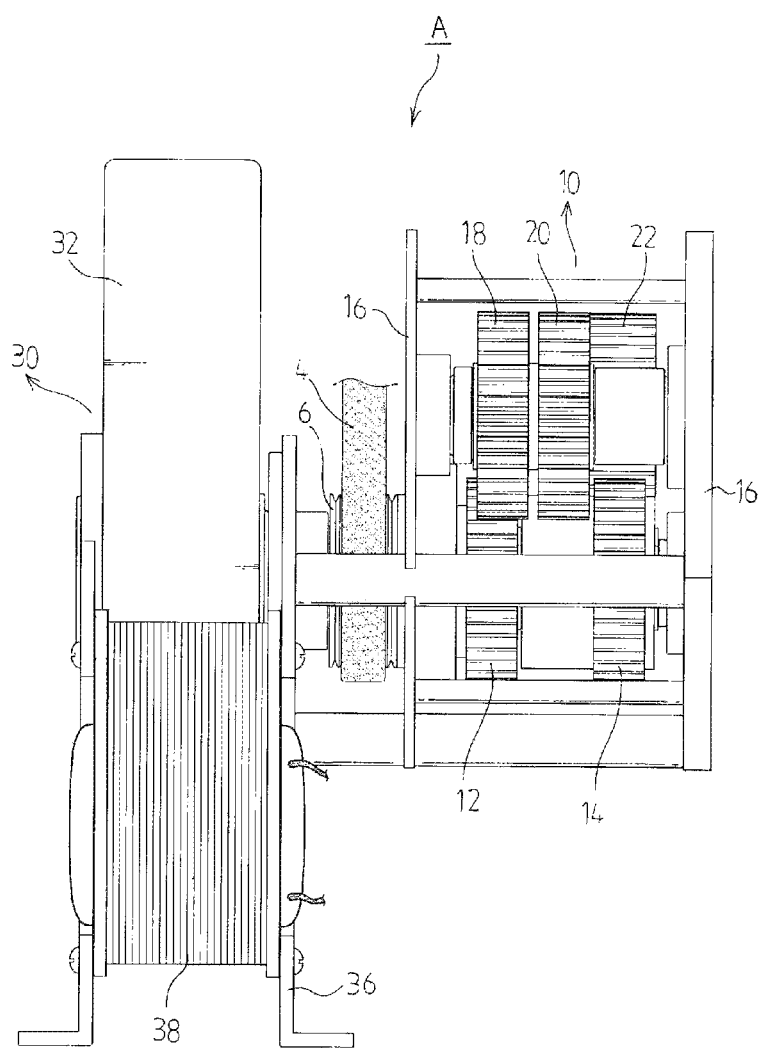
FIG. 1 is a perspective view of a conventional gear-driving apparatus for private power generation.

The above and other objects and novel features of the present invention will become more apparent from the descriptions of the present specification and the accompanying drawings.

In descriptions of a portable private power generation apparatus according to the present invention, first and second rotating members, first and second wires, and first and second spring members, which are provided on the left and right portions or upper and lower portions of the fly-wheel member, may be described as a pair of rotating members, a pair of wires, and a pair of spring members.

Further, the first rotating member, the first wire, and the first spring member are operated independently from the second rotating member, the second wire, and the second spring member, the first rotating member and the second rotating member are manufactured as identical components, the first wire and the second wire are manufactured as identical components, and the first spring member and the second spring member are manufactured as identical components. And thus, instead of descriptions of each of the first and second rotating members, the first and second wires, and the first and second spring members, as any one of the first and second rotating members, the first and second wires, and the first and second spring members, symbols in the drawings will be described simply to correspond to the rotating member, the wire, and the spring member.

Hereinafter, a configuration of the present invention will be described with reference to the accompanying drawings.

Figure 2:
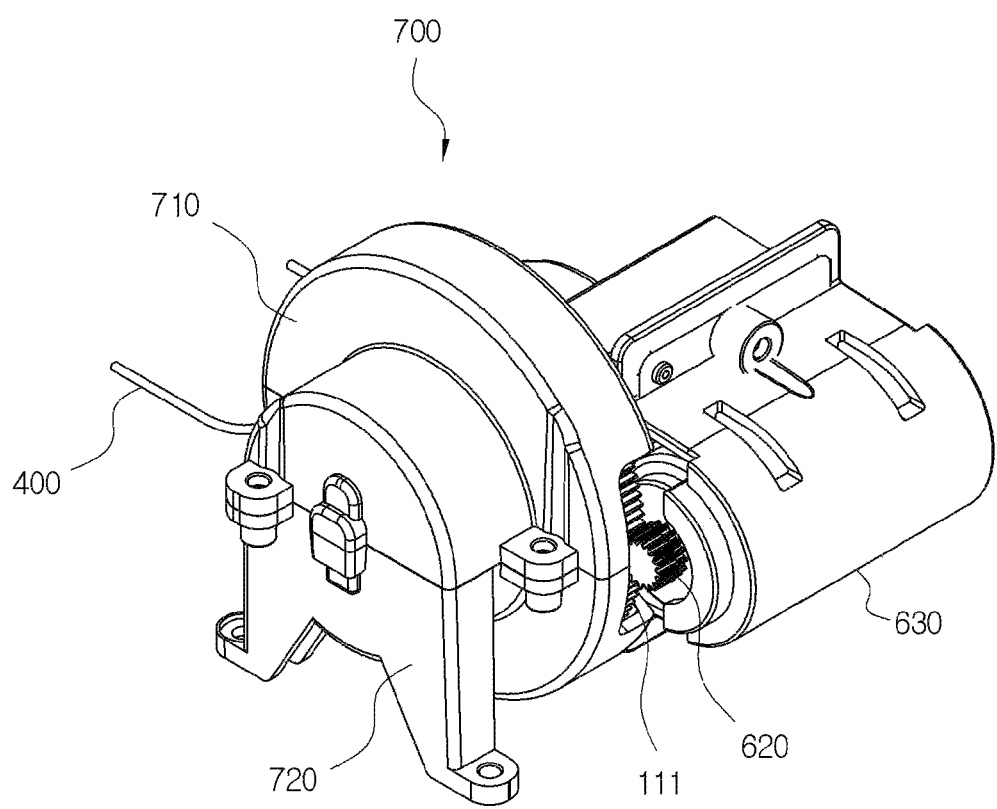
FIG. 2 is an exterior perspective view of a portable private power generation apparatus according to the present invention.
Figure 3A:
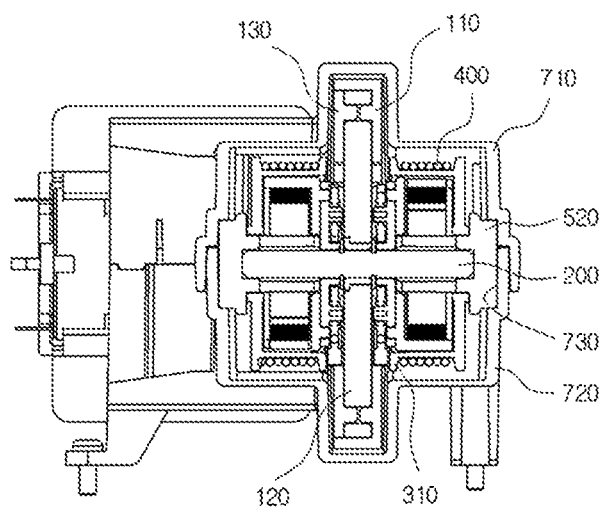
FIGS. 3(a) and 3(b) show front and lateral cross-sectional views of the portable private power generation apparatus shown in FIG. 2.
Figure 3B:
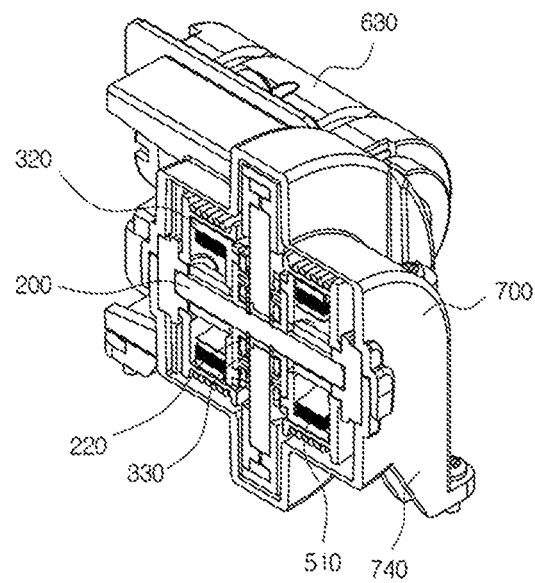
Figure 4:
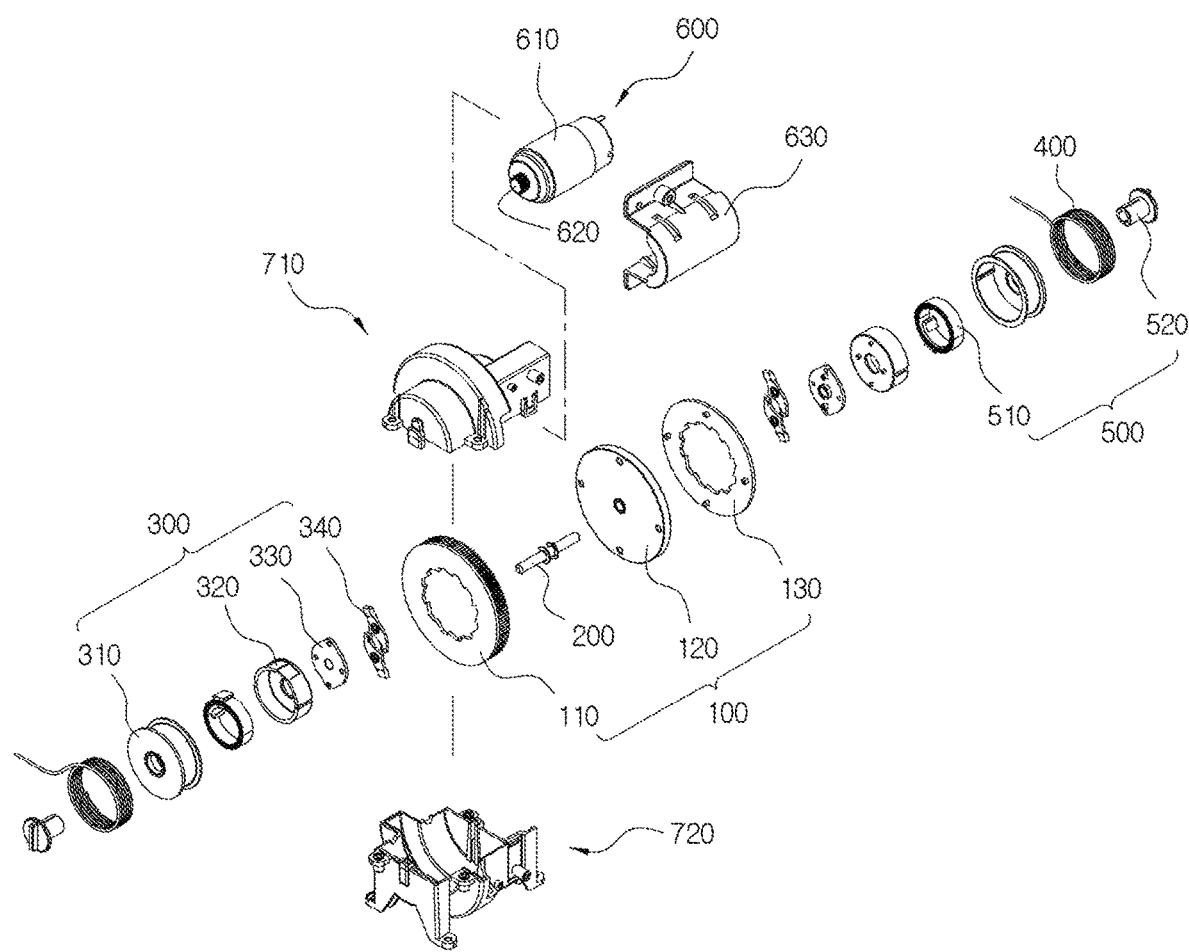
FIG. 4 is an exploded perspective view of the portable private power generation apparatus shown in FIG. 2.
Figure 5:
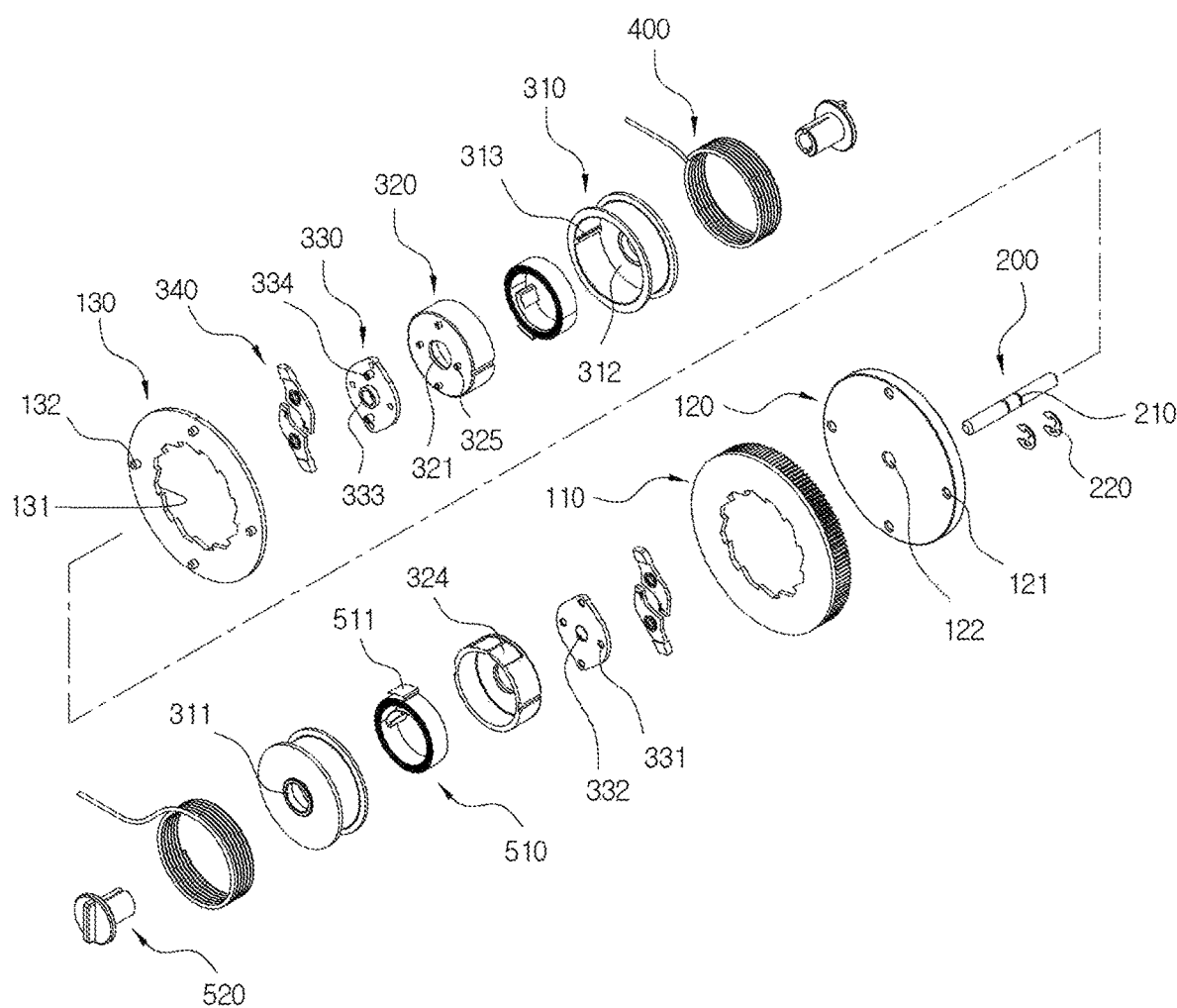
FIG. 5 is an enlarged exploded perspective view of main parts of the portable private power generation apparatus shown in FIG. 4.
Figure 6:
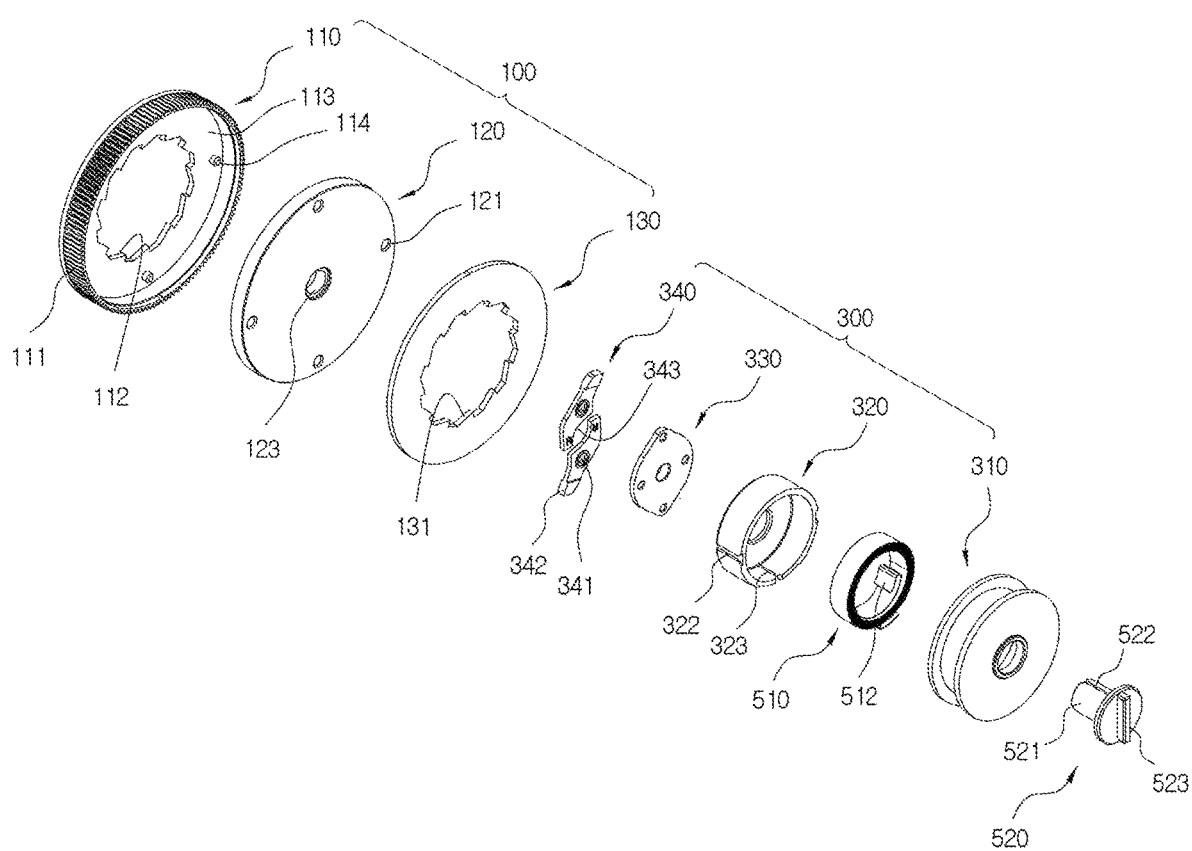
FIG. 6 is a perspective view for describing configurations of a fly-wheel member and a rotating member of the portable private power generation apparatus according to the present invention.

FIG. 2 is an exterior perspective view of a portable private power generation apparatus according to the present invention, FIGS. 3(a) and 3(b) show front and lateral cross-sectional views of the portable private power generation apparatus shown in FIG. 2, FIG. 4 is an exploded perspective view of the portable private power generation apparatus shown in FIG. 2, FIG. 5 is an enlarged exploded perspective view of main parts of the portable private power generation apparatus shown in FIG. 4, and FIG. 6 is a perspective view for describing configurations of a fly-wheel member and a rotating member of the portable private power generation apparatus according to the present invention.

As shown in FIGS. 2 to 4, the portable private power generation apparatus according to the present invention includes a rotatable fly-wheel member 100, a shaft 200 coupled to the fly-wheel member 100, first and second rotating members 300 that rotate the fly-wheel member 100, first and second wires 400 that rotate the first and second rotating members 300 through pulling operations, first and second spring members 500 that perform winding operations on each of the first and second wires 400, a power generation member 600 that generates power according to rotation of the fly-wheel member, and a cover member 700 that accommodates the fly-wheel member 100, the first and second rotating members 300, the first and second wires 400, and the first and second spring members 500.

Further, as shown in FIG. 4, the first and second rotating members 300, in which the first and second spring members 500 are embedded, respectively, and the first and second wires 400 are provided on the left and right portions of the fly-wheel member 100. Since the first and second spring members 500 are formed as identical components, the first and second rotating members 300 are formed as identical components, and the first and second wires 400 are formed as identical components, the following descriptions will be made based on either one of them. Further, in the present invention, unlike the conventional technology, since the pair of rotating members 300 and the pair of wires 400 are provided, even when any one of the rotating members 300 and any one of the wires 400 are damaged when used for a long time, the other one of the rotating members 300 or the other one of the wires 400 may be used without stopping, and thus a preliminary function may be provided. Further, since the pair of rotating members 300 are formed as identical components, the pair of wires 400 are formed as identical components, and the pair of spring members 500 are formed as identical components, costs for designing and manufacturing components can be reduced, and costs for manufacturing a private power generation apparatus can be reduced.

In addition, in the structure shown in FIG. 4, the first and second rotating members 300 are provided on the left and right portions of the fly-wheel member 100, but the present invention is not limited thereto. In the structure in which the fly-wheel member 100 is recumbent, the first and second rotating members 300 may be provided on upper and lower sides of the fly-wheel member 100.

As shown in FIGS. 4 to 6, the fly-wheel member 100 includes a fly-wheel main body 110 that includes a ring gear 111 provided on an outer side thereof and a first clutch gear 112 provided on an inner side thereof, a fly-wheel support 120 that is inserted into the fly-wheel main body 110, and a fly-wheel 130 that is coupled to the fly-wheel support 120 and includes a second clutch gear 131 provided therein.

The fly-wheel main body 110 has a disc shape, is made of an engineering plastic such as polycarbonate, and as shown in FIG. 6, includes a space part 113 and a first clutch gear 112, wherein the space part 113 is formed on an inner side thereof along a ring gear 111 provided on an outer circumference thereof, and the first clutch gear 112 includes eight sawteeth and is formed in the central portion of the space part 113. Each of the sawteeth is formed to be inclined in one direction, for example, in a shape that protrudes at an angle of 60 to 80°. Further, four first protrusions 114 are provided on a circumferential portion of the space part 113 at intervals of 90°.

The fly-wheel support 120 is provided to transfer a rotational force of the fly-wheel 130 to the fly-wheel main body 110, and as shown in FIGS. 5 and 6, is formed of a metal material as a cylinder to be inserted into and mounted in the space part 113 of the fly-wheel main body 110. An insertion hole 122 is provided in a central portion of the fly-wheel support 120 to allow the shaft 200 to be inserted thereinto and includes four through holes 121 formed in an edge portion thereof to allow the four first protrusions 114 to be inserted thereinto. Therefore, when the four first protrusions 114 are insertion-coupled to the four through holes 121, as shown in FIGS. 3(a) and 3(b), the fly-wheel main body 110 and the fly-wheel support 120 are integrated. Further, a bearing 123 is provided around the insertion hole 122 to transfer a rotational force of the fly-wheel 130 to the fly-wheel main body 110 irrespective of the shaft 200 inserted into the insertion hole 122. That is, the bearing 123 is provided to prevent rotation interference due to the shaft 200.

The fly-wheel 130 is made of the same material as the fly-wheel main body 110, has a disc shape and, as shown in FIG. 5, includes a second clutch gear 131, wherein the second clutch gear 131 includes eight sawteeth and is provided in the same direction as the first clutch gear 112. That is, each of the sawteeth of the second clutch gear 131 is formed to be inclined in one direction, for example, in a shape that protrudes at an angle of 60 to 80°. Further, four second protrusions 132 are provided on a circumferential portion thereof and the four second protrusions 132 are insertion-coupled to the four through holes 121 of the fly-wheel support 120, and thus the fly-wheel main body 110, the fly-wheel support 120, and the fly-wheel 130 are integrated.

Further, in the above descriptions, the first protrusions 114 and the second protrusions 132 are insertion-coupled to both left and right sides of the four through holes 121 to be integrated, but the present invention is not limited thereto. The fly-wheel main body 110, the fly-wheel support 120, and the fly-wheel 130 may be integrally made of a high-strength plastic material using a mold. Further, in the descriptions, there are four of the through holes and the protrusions, but the present invention is not limited thereto, and there may be two or more of the through holes and the protrusions.

As described above, the fly-wheel member 100 applied to the present invention is not formed of a metal and formed with a bearing so that a one-way clutch used for a general mechanical device or vehicle components rotates at a high speed but is formed of engineering plastic. That is, in the present invention, the fly-wheel member 100 is accelerated by the first clutch gear 112 and the second clutch gear 131, which are provided in the fly-wheel main body 110 and the fly-wheel 130, and the pair of rotating members 300. Therefore, since power generation is performed at hundreds of RPMs, which is less than thousands of RPMs at a high speed of the one-way clutch used for the general mechanical device or the vehicle components, the fly-wheel main body 110 and the fly-wheel 130 are not formed of a metal material but formed of an engineering plastic, such as ACETAL, in a small size and in a lightweight manner so as to stably generate power, wherein the engineering plastic has durability and abrasion resistance higher than that of conventional plastic such as acrylonitrile butadiene styrene (ABS) etc.

As shown in FIG. 5, the shaft 200 is made of, for example, stainless steel. A pair of ring-shaped grooves 210 are provided along a circumference of the shaft 200, and the fly-wheel support 120 is provided between the pair of ring-shaped grooves 210. E-rings 220 are insertion-coupled to the pair of ring-shaped grooves 210 to prevent the shaft 200 from coming out when the fly-wheel support 120 made of a metal rotates.

As shown in FIGS. 5 and 6, the pair of rotating members 300 are provided to be insertion-coupled to the left and right portions of the fly-wheel member 100. That is, each of the pair of rotating members 300 includes a reel 310, a spring cover 320, a locking plate 330, and a pair of locking members 340, wherein the reel 310 maintains a state in which the wire 400 is wound and is rotatable according to whether the wire is pulled or wound, the spring cover 320 is insertion-coupled to the reel 310 and includes the spring member 500 embedded therein, the locking plate 330 is mounted in the spring cover 320, the pair of locking members 340 are insertion-coupled to the first clutch gear 112 of the fly-wheel main body 110 and the second clutch gear 131 of the fly-wheel 130 so that the fly-wheel member 100 rotates in one direction, and the pair of locking members 340 are mounted in the locking plate 330.

Further, the spring member 500 includes a spiral spring 510 that is embedded in the spring cover 320 and a spring holder 520 into which one end portion of the shaft 200 is inserted.

As shown in FIGS. 5 and 6, the reel 310 has a reel shape to maintain the wire 400 to be wound and includes a first hole 311, an accommodation part 312, and a plurality of protrusions 313, wherein the first hole 311 is provided in a central portion of the reel 310 so that the spring holder 520 is inserted thereinto, the accommodation part 312 accommodates the spring cover 320, and the plurality of protrusions 313 are provided on an inner side of the reel 310 and are insertion-coupled to the spring cover 320. In FIGS. 5 and 6, the plurality of protrusions 313 are provided as the pair of protrusions 313, but the present invention is not limited thereto, and there may be three of more of the protrusions 313.

As shown in FIGS. 5 and 6, the spring cover 320 has a cylindrical shape to hold the spiral spring 510 inside and includes a second hole 321, a plurality of grooves 322, an insertion part 323, and a seating part 324, wherein the second hole 321 is formed in a central portion of the spring cover 320 so that the spring holder 520 is inserted thereinto, the plurality of grooves 322 are formed in an outer side of the spring cover 320 to correspond to the plurality of protrusions 313 so that the plurality of protrusions 313 are fitted thereinto, the insertion part 323 is formed on a circumferential portion thereof so that one outer end portion 511 of the spiral spring 510 is inserted thereinto, and the seating part 324 allows one outer end portion that is inserted through the insertion part 323 to be seated therein. Therefore, in a state in which the one outer end portion 511 of the spiral spring 510 is seated in the seating part 324 through the insertion part 323, the one outer end portion 511 of the spiral spring 510 is insertion-coupled to the accommodation part 312 of the reel 310 to prevent the one outer end portion 511 of the spiral spring 510 from coming out of the spring cover 320. Further, as shown in FIG. 5, a plurality of protrusions 325 for coupling the locking plate 330 are formed on a surface of the spring cover 320 along a circumference of the second hole 321.

As shown in FIGS. 5 and 6, the locking plate 330 is formed in a substantially elliptical flat plate and includes a plurality of holes 331 and an insertion part 332, wherein the plurality of holes 331 allow the plurality of protrusions 325 to be fitted thereinto to correspond to the plurality of protrusions 325 and are provided around the periphery of the flat plate, and the insertion part 332 is provided in a central portion of the locking plate 330 so that the shaft 200 passes therethrough. Further, a support protrusion 333 cylindrically protrudes around the insertion part 332 and supports rotation of the locking members 340, and a pair of protrusions 334 are provided around the support protrusion 333 to be insertion-coupled to the locking members 340. Each of the pair of the protrusions 334 is formed in two stages to have a step.

As shown in FIG. 6, the pair of locking members 340 are provided, and each of the locking members 340 includes openings 341 insertion-coupled to the pair of protrusions 334, claw parts 342 engaged to the sawteeth of the first clutch gear 112 and the second clutch gear 131, and a circular arc part 343 that has a semi-circular shape to correspond to the cylindrical support protrusion 333. The openings 341 are formed in two stages to correspond to the protrusions 334 formed in two stages so as to maintain the locking plate 330 to be firmly insertion-coupled to the locking members 340. As shown in FIG. 6, each of the claw parts 342 has a step to transfer a sufficient rotational force to the first clutch gear 112 and the second clutch gear 131. The locking members 340 are insertion-coupled to the first clutch gear 112 and the second clutch gear 131 on substantially the same plane as the fly-wheel main body 110 and the fly-wheel 130. Therefore, in the portable private power generation apparatus according to the present invention, the pair of rotating members in which the spring member is embedded are insertion-coupled to the left and right portions of the fly-wheel member so that the portable private power generation apparatus is formed in a small size.

The wire 400 is made of a metal material or a fiber material, but any material that performs a function of winding or unwinding on the reel 310 may be sufficient, and the wire is not limited to a specific material. One end portion of the wire 400 may be fixed to the reel 310, and the other end portion of the wire 400 may be fixed to a handle described below. Therefore, a pulled state of the wire 400 may be adjusted by an elastic force of the spiral spring 510.

The spiral spring 510 is made of a spring steel and maintains a spring state that is wound, for example, in a range of 8 to 12 times. One outer end portion 511 of the spiral spring is inserted into the insertion part 323 formed in the spring cover 320, and one inner end portion of the spiral spring 510 is inserted into the spring holder 520. The spiral spring 510 is maintained in a wound state, and correspondingly, the wire 400 is also maintained in a wound state around the reel 310. Therefore, pulling of the wire 400 by a user is limited according to an unwinding condition of the spiral spring 510, and the wire 400 is restored to a state in which the wire 400 is wound around the reel 310 by a restoring force of the spiral spring 510.

As shown in FIG. 6, the spring holder 520 includes a protrusion 521 that has a hollow so that one end portion of the shaft 200 is inserted thereinto, wherein the protrusion 521 includes a cut-out part 522 into which one inner end portion 512 of the spiral spring 510 is fitted. Therefore, while the one inner end portion 512 of the spiral spring 510 is inserted into the cut-out part 522, one end portion of the shaft 200 is insertion-coupled to the hollow to prevent the one inner end portion 512 of the spiral spring 510 from coming out of the protrusion 521. Further, as shown in FIGS. 5 and 6, the spring holder 520 includes a protrusion 523 provided in a 1-shape to block rotation of the spring holder 520. That is, as shown in FIGS. 3(a) and 3(b), the protrusion 523 is inserted into and fixed to a concave part 730 provided in the cover member 700 to allow the protrusion 523 to block rotation of the spring holder 520. Further, the protrusion 523 is mounted in and fixed to the cover member 700 to maintain a gap so that the fly-wheel member 100 and the rotating member 300 are rotatable in the cover member 700.

As shown in FIGS. 2 and 4, the power generation member 600 includes a motor 610, a gear 620 provided on a rotating shaft of the motor 610, and a motor bracket 630 that mounts the motor 610 in the cover member 700. When the motor bracket 630 is mounted in the cover member 700, the gear 620 is engaged with the ring gear 111 provided on an outer circumference of the fly-wheel main body 110, and when the fly-wheel member 100 rotates, the gear 620 rotates to allow the motor to generate power. A gear ratio of the ring gear 111 to the gear 620, which are engaged with each other, is not specified but may have as large a value as possible to facilitate power generation. Further, since the motor 610 is mounted in the cover member 700 by the motor bracket 630, the power generation member 600 may be variously used according to the power generation capacity of the motor 610.

As shown in FIGS. 2 to 4, the cover member 700 includes an upper cover 710 and a lower cover 720 that are provided to be separable. Each of the upper cover 710 and a lower cover 720 includes an accommodation part that has a shape corresponding to the shapes of the fly-wheel member 100 and the pair of rotating members 300 and accommodates the fly-wheel member 100 and the pair of rotating members 300 to be spaced apart therefrom. The accommodation part is not limited to a specific shape, and any shape that is formed to be small and has a space in which the fly-wheel member 100 and the pair of rotating members 300 are rotatable may be sufficient. Further, the upper cover 710 or the lower cover 720 has holes through which front end portions of the pair of wires 400 are withdrawn. The holes are also not limited to a specific condition and any one that prevents damage to the wires in an operation in which the wires 400 are pulled or wound may be sufficient.

Further, as shown in FIGS. 3A and 3B, since the protrusion 523 of the spring holder 520 is inserted into and fixed to a concave part 730 provided by the upper cover 710 and the lower cover 720, one inner end portion 512 of the spiral spring 510 may be fixed without rotation. Therefore, the protrusion 523 is fixed by the upper cover 710 and the lower cover 720 to maintain a gap so that the fly-wheel member 100 and the rotating members 300 are rotatable in the upper cover 710 and the lower cover 720.

Further, the lower cover 720 includes a leg member 740 that is fixed to a bottom member of a module described below.

Hereinafter, a coupling structure of the fly-wheel member 100 and the rotating members 300 will be described below.

In an assembly of the portable private power generation apparatus according to the present invention, the fly-wheel support 120 is inserted into the shaft 200, the fly-wheel support 120 is insertion-coupled to the fly-wheel main body 110, and the fly-wheel 130 is insertion-coupled to the fly-wheel support 120, and thus the fly-wheel member 100 is assembled.

To assemble one of the spring members 500 and one of the rotating members 300, the reel 310 around which the wire 400 is wound is inserted into one side of the fly-wheel member 100, an one inner end portion 512 of the spiral spring 510 is inserted into the cut-out part 522 of the spring holder 520, and one end portion of the shaft 200 is insertion-coupled to the spring holder 520. While one outer end portion 511 of the spiral spring 510 is seated in the seating part 324 through the insertion part 323 of the spring cover 320, the locking plate 330 is insertion-coupled to the spring cover 320, and the locking member 340 is insertion-coupled to the locking plate 330. Next, the other one of the spring members 500 is assembled to the other one of the rotating members on the other side of the fly-wheel member 100 as described above, and thus the fly-wheel member 100 is coupled to the pair of rotating members 300 as shown in FIGS. 3(a) and 3(b).

Therefore, the fly-wheel member 100 coupled to the pair of rotating members 300 is mounted in the lower cover 720, the upper cover 710 covers the lower cover 720, the upper cover 710 is screw-fastened to the lower cover 720, and the power generation member 600 is mounted in the cover member 700, and thus, as shown in FIG. 2, the portable power generation apparatus according to the present invention is formed.

Next, the coupling state of the fly-wheel member 100 and the rotating members 300 and rotation of the fly-wheel member 100 will be described with reference to FIGS. 7 and 8.

Figure 7:
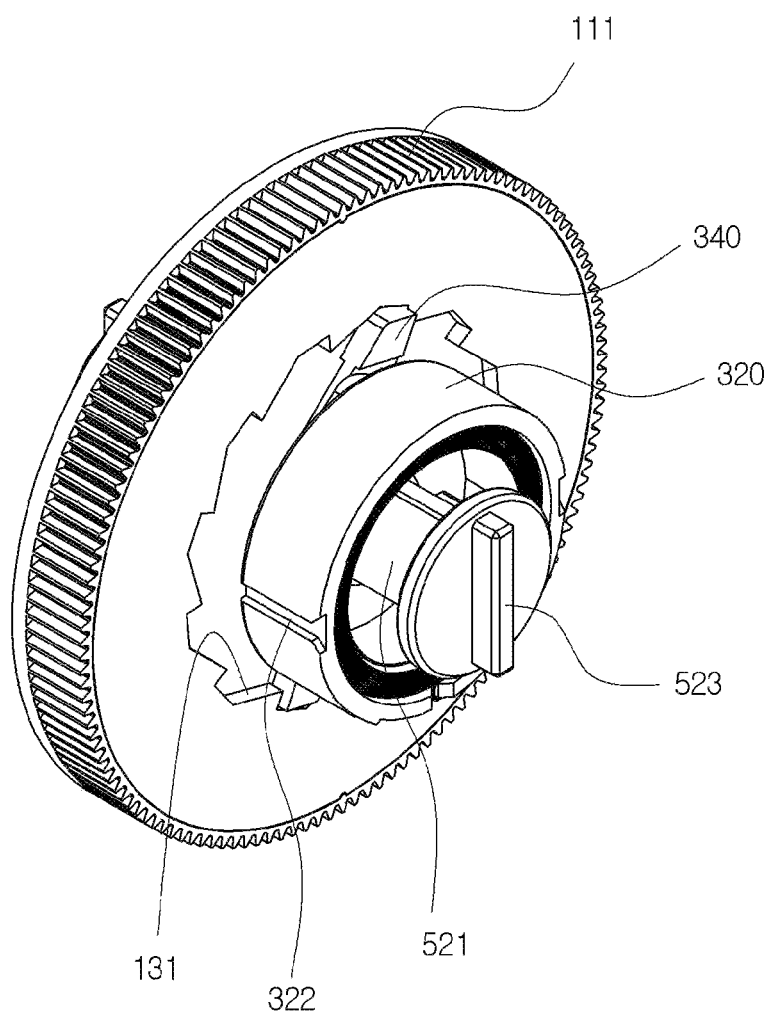
FIG. 7 is a perspective view for describing a rotation state of the fly-wheel member.
Figure 8:
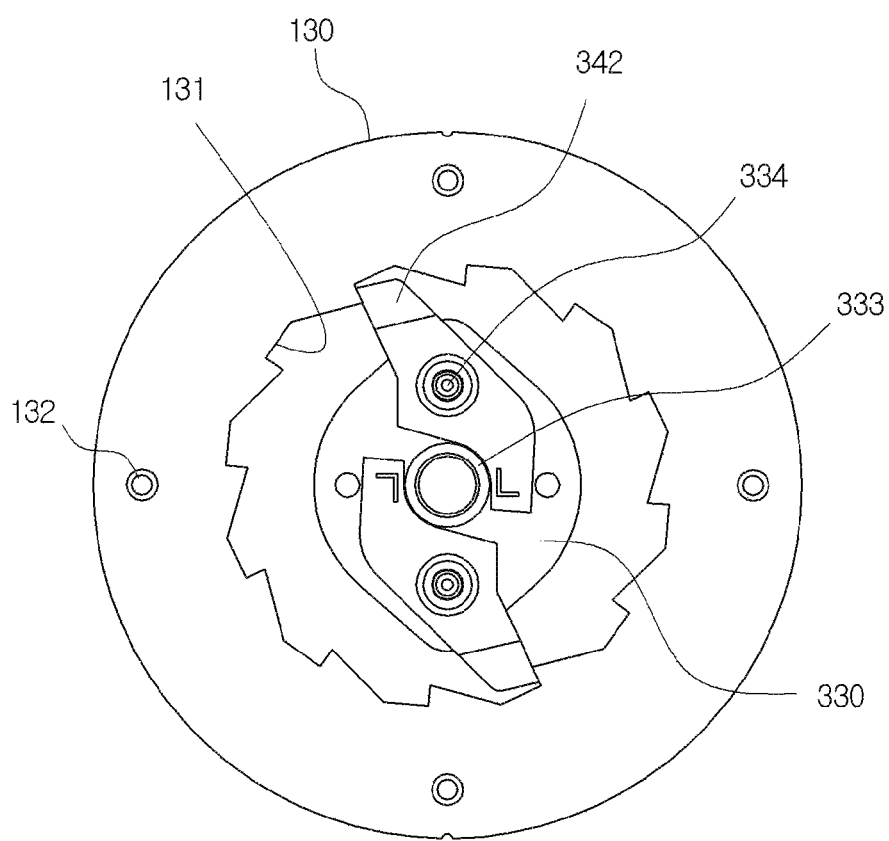
FIG. 8 is a view for describing a state in which a locking member is inserted and insertion-coupled to the fly-wheel member.

FIG. 7 is a perspective view for describing a rotation state of the fly-wheel member, and FIG. 8 is a view for describing a state in which the locking members are insertion-coupled to the fly-wheel. In FIGS. 7 and 8, configurations of the reel 310 and the wire 400 are omitted to clearly show the coupling state. Further, FIG. 7 shows a state of the fly-wheel 130 when viewed from the rotating member 300, and FIG. 8 shows a state of the locking member 340 when viewed from the fly-wheel 130.

As shown in FIGS. 3 and 7, the first clutch gear 112 of the fly-wheel main body 110 or the second clutch gear 131 of the fly-wheel 130 may be maintained to be engaged with the locking members 340. That is, each of the sawteeth of the first clutch gear 112 and the second clutch gear 131, which are formed to be inclined in one direction, is maintained to be engaged with an angular portion of each of the claw parts 342 of the locking members 340. Therefore, as shown in FIG. 7, when the rotating members 300 are rotated by pulling the wires 400 in a clockwise direction, that is, when the locking members 340 are rotated in a clockwise direction, the second clutch gear 131 engaged with the claw parts 342 is also rotated in a clockwise direction.

Meanwhile, when a user stops pulling the wire 400, the wire 400 is wound around the reel 310 by an elastic force of the spring member 500, and the rotating member 300 is rotated in a clockwise direction as shown in FIG. 7. That is, as shown in FIG. 8, when the locking plate 330 of the rotating member 300 is rotated, each of the claw parts 342 is unengaged from each of the sawteeth of the second clutch gear 131, and thus the fly-wheel 130 is not rotated. Therefore, the fly-wheel member 100 according to the present invention is rotated in one direction, for example, only in a clockwise direction as shown in FIG. 7.

Next, a module equipped with the portable private power generation apparatus according to the present invention will be described with reference to FIGS. 9 to 10.

Figure 9:
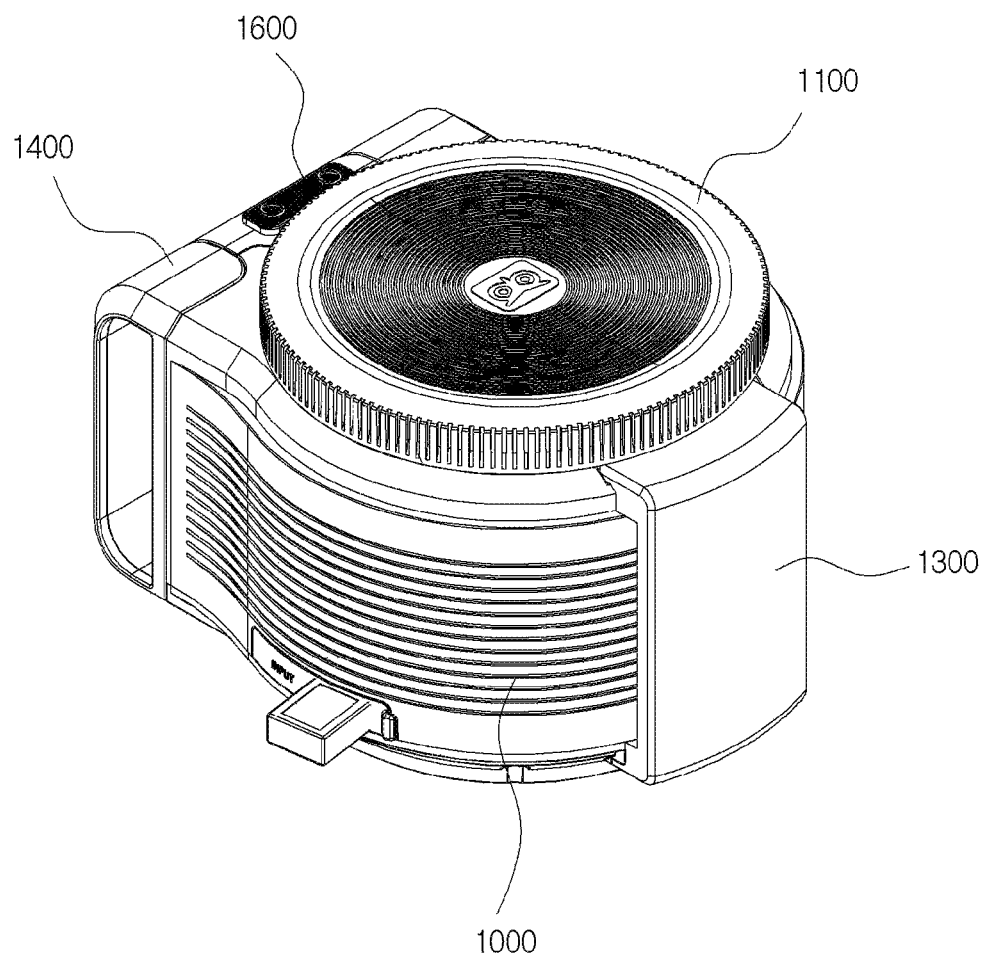
FIG. 9 is an exterior perspective view of a module equipped with the portable private power generation apparatus according to the present invention.
Figure 10:
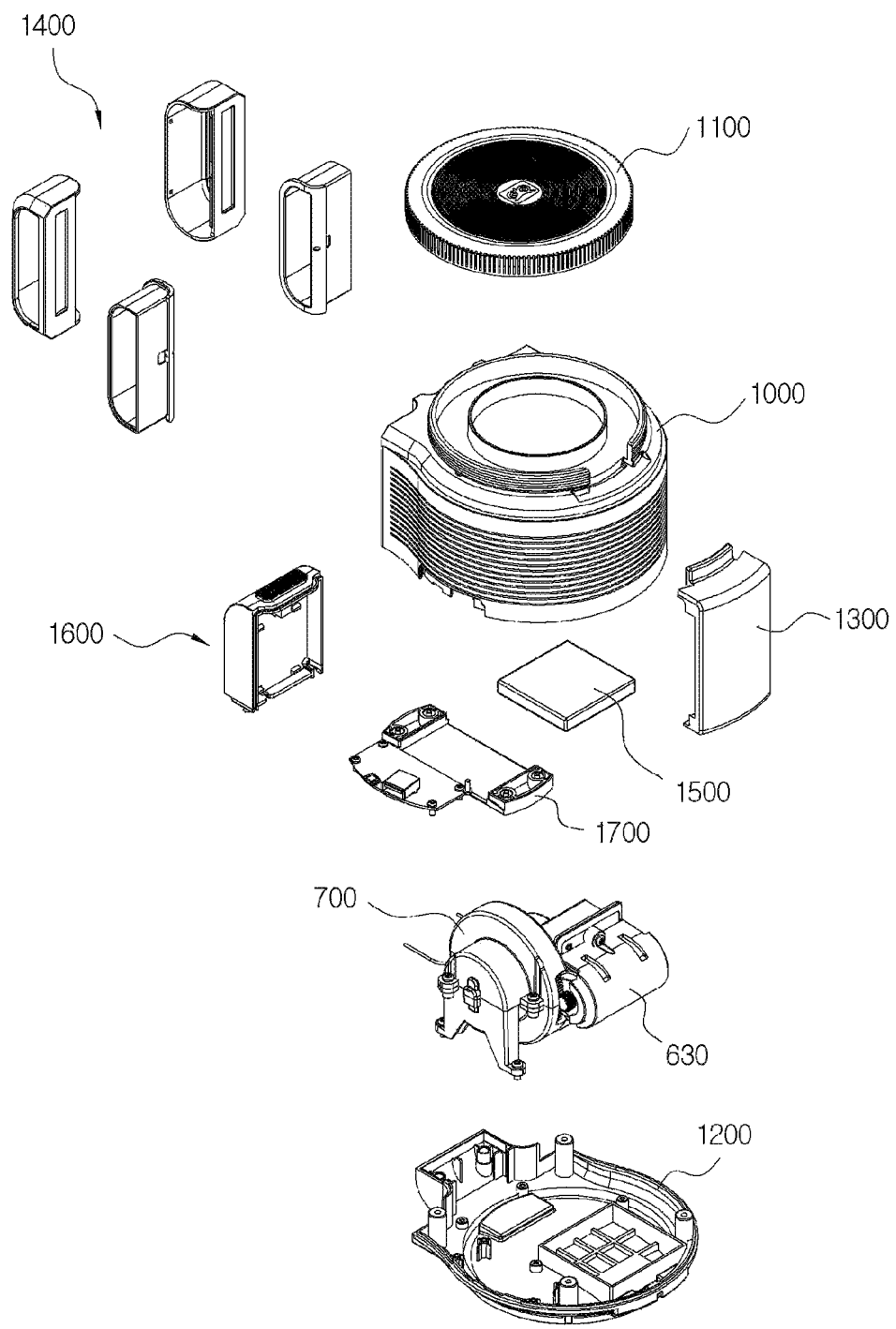
FIG. 10 is an exploded perspective view of the module shown in FIG. 9.

FIG. 9 is an exterior perspective view of a module equipped with the portable private power generation apparatus according to the present invention, and FIG. 10 is an exploded perspective view of the module shown in FIG. 9.

The module equipped with the portable private power generation apparatus according to the present invention, as shown in FIGS. 9 and 10, includes a main body 1000, a cover 1100 that is screw-fastened to an upper portion of the main body 1000, a bottom member 1200 that is coupled to the main body 1000 and fixes the portable private power generation apparatus, a hook 1300 that fixes the main body 1000 to a branch, a belt member, or the like, for example, in mountain climbing, and a pair of handles 1400 that are coupled to the pair of wires 400 and allow a user to alternately pull the wires 400 with two hands. For example, as shown in FIG. 10, the bottom member 1200 includes four screw-coupling grooves, and as shown in FIGS. 3(a) and 3(b), the leg members 740 are screw-fastened to the grooves, and thus the portable private power generation apparatus is firmly fixed.

That is, as shown in FIG. 10, a lower portion of the hook 1300 is insertion-coupled to the bottom member 1200, and the upper portion of the hook 1300 is provided as a part of screw thread provided on an upper portion of the main body 1000 and is screw-coupled to the cover 1100, and thus the hook 1300 is firmly fixed to one side of the main body 1000.

Therefore, the hook 1300 is provided to be coupled to the belt member, which is separately provided, the belt member is coupled to the hook 1300, a user fixes the belt member to a foot of a user, an arm of another user, a tree, or the like, and the pair of handles 1400 are alternately pulled, and thus power generation may be performed by the wires 400.

Further, in FIGS. 9 and 10, a structure in which the hook 1300 is provided to mount the belt member is described, but the present invention is not limited thereto, and a structure in which the belt member is embedded in the main body 1000 may be used.

Further, the bottom member 1200 includes a battery 1500 that is charged with electricity generated by the power generation member 600 and a light emitting diode (LED) device 1600 provided between a pair of handles 1400, and thus a printed circuit board (PCB) 1700 for electrically controlling a charging state of the battery 1500 and the LED device 1600 is mounted on the bottom member 1200. A Universal Serial Bus (USB) terminal provided on a side surface of the main body 1000 is mounted on the PCB 1700. Therefore, power can be supplied to an electrical device, such as a smart phone, a laptop, a military or emergency communication device, a lighting device, or a heater, such as a hand warmer and an electric burner, wherein the electrical device or the heater is connected through the USB terminal.

The belt member and the USB cable may be embedded in an accommodation space which is, for example, provided between the main body 1000 and the cover 1100.

The LED device 1600 may include a function of, for example, displaying a charging state of the battery 1500 and a user's workout calorie consumption amount by operating the pair of handles 1400.

Further, in the descriptions, the example of the LED device 1600 is shown, but the present invention is not limited thereto, and an insect/mosquito repellent device, an emergency light, a rescue signal apparatus, or the like, which uses power, may be used instead of the LED device 1600.

Since an upper portion of the main body 1000 that accommodates the portable private power generation apparatus according to the present invention has a structure for screw-coupling, an insect/mosquito repellent device module, an emergency light module, a rescue signal apparatus module, a heater module, a cooler module, and the like, which may be screw-coupled, may be coupled to an upper portion of the main body 1000 for use.

An operation of the module equipped with the portable private power generation apparatus according to the present invention will be described. Further, in the following descriptions, for convenience of description, rotation by an operation in which a wire is pulled refers to a forward rotation, and rotation by an operation in which the wire is wound refers to a reverse rotation.

First, when the hook 1300 mounted in the main body using the belt member is fixed to a foot of a user, and a right handle of the pair of handles 1400 is pulled, the first wire is pulled, and thus the reel 310 of the first rotating member is rotated forward. When the reel 310 of the first rotating member is rotated forward, the spring cover 320 of the first rotating member, which includes a plurality of grooves 322 into which a plurality of protrusions 313 of the reel 310 are inserted, is rotated forward in the same direction as the reel 310 of the first rotating member. Further, when the spring cover 320 is rotated forward, the locking plate 330 of the first rotating member that is insertion-coupled to the plurality of protrusions 325 of the spring cover 320 of the first rotating member is rotated forward. When the locking plate 330 is rotated forward, the locking members 340 of the first rotating member insertion-coupled to the protrusions 334 of the locking plate 330 of the first rotating member are rotated forward. When the locking members 340 of the first rotating member are rotated forward, the first clutch gear 112 engaged with the claw parts 342 of the locking members 340 is rotated forward, and when the first clutch gear 112 is rotated, the ring gear 111 is rotated forward. When the ring gear 111 is rotated forward, the gear 620 of the power generation member 600 engaged with the ring gear is rotated forward, and the motor 610 is operated to correspond to the forward rotation of the gear 620, and thus power is generated.

As described above, a process in which a user pulls the right handle is controlled by an elastic force of the spiral spring 510, and thus the user should stop a process of pulling the right handle to perform a process of pulling the left handle.

When the process of pulling the right handle is stopped, the first wire 400 is wound around the reel 310 of the first rotating member by an elastic force of the spiral spring 510, and thus the reel 310 of the first rotating member is rotated in the reverse direction. When the reel 310 of the first rotating member is rotated in the reverse direction, the spring cover 320 of the first rotating member, which includes a plurality of grooves 322 into which the plurality of protrusions 313 of the reel 310 are fitted, is rotated in the reverse direction that is the same direction as the reel 310 of the first rotating member. Further, when the spring cover 320 is rotated in the reverse direction, the locking plate 330 of the first rotating member insertion-coupled to the plurality of protrusions 325 of the spring cover 320 of the first rotating member is rotated in the reverse direction, and when the locking plate 330 is rotated in the reverse direction, the locking members 340 of the first rotating member insertion-coupled to the protrusion 334 of the locking plate 330 of the first rotating member are rotated in the reverse direction. When the locking members 340 of the first rotating member are rotated in the reverse direction, the claw parts 342 of the locking members 340 are unengaged from the sawteeth of the first clutch gear 112, and the first clutch gear 112 is not rotated. That is, the fly-wheel main body 110 according to the present invention is only rotated forward.

Meanwhile, when the left handle of the pair of handles 1400 is pulled, the second wire is pulled, and thus, the reel 310 of the second rotating member is rotated forward. When the reel 310 of the second rotating member is rotated forward, the spring cover 320 of the second rotating member that includes the plurality of grooves 322 into which the plurality of protrusions 313 of the reel 310 are fitted is rotated forward in the same direction as the reel 310 of the second rotating member. Further, when the spring cover 320 is rotated forward, the locking plate 330 of the second rotating member insertion-coupled to the plurality of protrusions 325 of the spring cover 320 of the second rotating member is rotated forward, and when the locking plate 330 is rotated forward, the locking members 340 of the second rotating member insertion-coupled to the protrusion 334 of the locking plate 330 of the second rotating member are rotated forward. When the locking member 340 of the second rotating member is rotated forward, the second clutch gear 131 engaged with the claw parts 342 of the locking members 340 is rotated forward, and when the second clutch gear 131 is rotated, the ring gear 111 is rotated forward. When the ring gear 111 is rotated forward, the gear 620 of the power generation member 600 engaged with the ring gear is rotated forward, and the motor 610 is operated to correspond to the forward rotation of the gear 620, and thus power is generated.

Further, pulling of the left handle of the second wire is limited by an elastic force of the spiral spring 510, so a user should stop a process of pulling the left handle.

When the process of pulling the left handle is stopped, the second wire 400 is wound around the reel 310 of the second rotating member by the elastic force of the spiral spring 510, therefore, the reel 310 of the second rotating member is rotated in the reverse direction. When the reel 310 of the second rotating member 300 is rotated in the reverse direction, the spring cover 320 of the second rotating member, which includes the plurality of grooves 322 into which the plurality of protrusions 313 of the reel 310 are inserted, is rotated in the reverse direction that is the same direction as the reel 310 of the second rotating member. Further, when the spring cover 320 is rotated in the reverse direction, the locking plate 330 of the second rotating member insertion-coupled to the plurality of protrusions 325 of the spring cover 320 of the second rotating member is rotated in the reverse direction, and when the locking plate 330 is rotated in the reverse direction, the locking members 340 of the second rotating member insertion-coupled to the protrusions 334 of the locking plate 330 of the second rotating member are rotated in the reverse direction. When the locking members 340 of the second rotating member is rotated in the reverse direction, the claw parts 342 of the locking members 340 are unengaged from the sawteeth of the second clutch gear 131, and thus the second clutch gear 131 is not rotated. That is, the fly-wheel main body 110 according to the present invention is rotated only in the forward direction.

As described above, a user alternately repeats pulling the left handle and the right handle to allow the fly-wheel member 100 to continuously rotate forward, and thus the power generation member 600 may continuously perform power generation. That is, the user repeats pulling wires with one hand or two hands to allow power generation to be performed for a long time.

Hereinbefore, although the present invention invented by the inventor has been described in detail with reference to the above embodiments, the present invention is not limited to the above-described embodiments, and various modifications may be made without departing from the spirit of the present invention.

That is, in the descriptions of the embodiments, a structure in which the locking plate 330 is insertion-coupled to the spring cover 320 has been described, but the present invention is not limited thereto, and as shown in FIG. 10, a structure in which the spring cover and the locking plate are integrated may be used.

Figure 11:
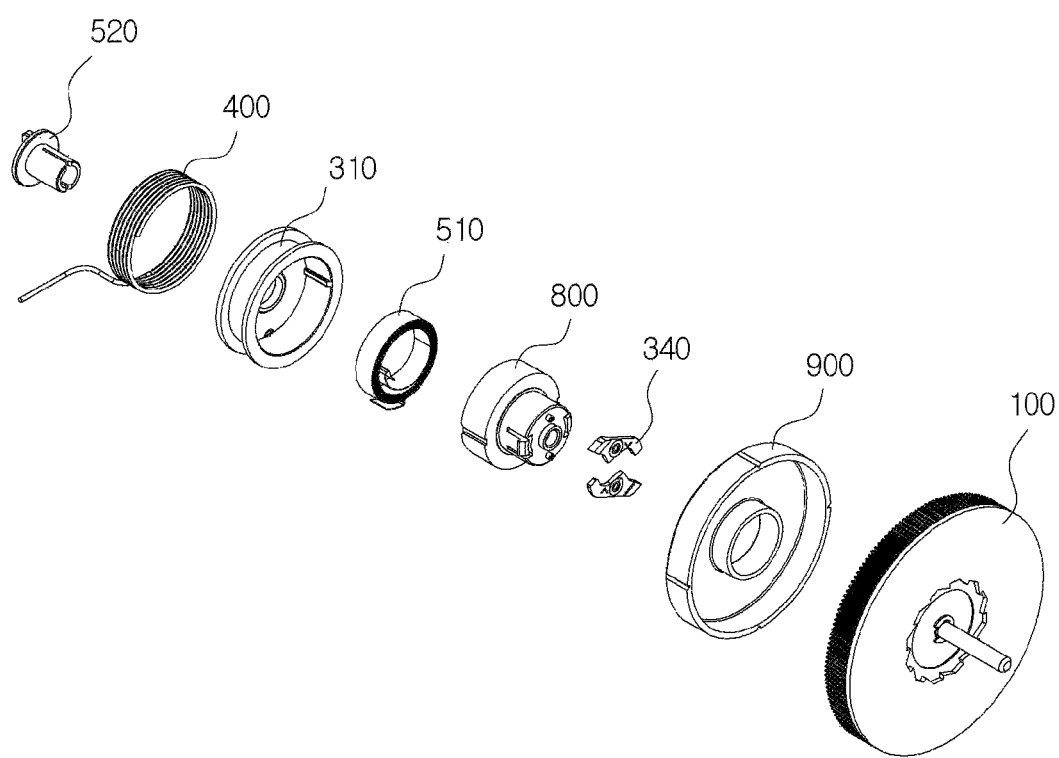
FIG. 11 is a perspective view for describing configurations of a fly-wheel member and a rotating member of a portable private power generation apparatus according to another embodiment of the present invention.

FIG. 11 is a perspective view for describing structures of a fly-wheel member and rotating members of a portable private power generation apparatus according to another embodiment of the present invention.

As shown in FIG. 11, in the portable private power generation apparatus according to another embodiment of the present invention, a spring cover and a locking plate are integrated so that a spring cover 800 is provided in two stages, and a locking member 340 is insertion-coupled to a surface of the spring cover 800 and is inserted into a hole provided in a center of a support 900, and thus a structure of being coupled to a fly-wheel member 100 may be provided. As described above, a support 900 guides the locking members 340 to prevent the locking members 340 from coming out of the fly-wheel member 100.

Further, in the descriptions, the portable private power generation apparatus, which is formed in a small size and performs private power generation at high efficiency to charge a battery, and a module equipped with the same has been described, but the present invention is not limited thereto, and the size of the private power generation apparatus is enlarged, and thus the large capacity of private power can be generated.

INDUSTRIAL APPLICABILITY

A portable private power generation apparatus and a module equipped with the same according to the present invention allow a user to repeatedly pull wires with one hand or two hands in a time of emergency when general power is not supplied such as during military operations, in refugee camps, during disasters due to earthquakes and the like, in emergency situations on ships, during outdoor activities, and the like.

The invention claimed is:

1. A portable power generation apparatus comprising:
   a fly-wheel assembly configured to be rotatable around a shaft;
   a first rotating assembly disposed on one side of the fly-wheel assembly and configured to rotate the fly-wheel assembly and a second rotating assembly disposed on another side of the fly-wheel assembly and configured to rotate the fly-wheel assembly;
   a first wire and a second wire configured to rotate the first and second rotating assemblies, respectively, by a respective pulling operation;
   a first spring and a second spring configured to perform winding operations on the first and second wires, respectively; and
   a power generation assembly configured to generate power according to rotation of the fly-wheel assembly, wherein the fly-wheel assembly includes:
   a fly-wheel main body including a ring gear formed on an outer circumference thereof and a first clutch gear formed on an inner side thereof;
   a fly-wheel support seated inside the fly-wheel main body; and
   a fly-wheel coupled to the fly-wheel support and including a second clutch gear formed on an inner side thereof.

2. The portable power generation apparatus of claim 1, wherein the fly-wheel assembly is configured to rotate in only one direction, and
   wherein the first and second rotating assemblies are insertion-coupled to the fly-wheel assembly.

3. The portable power generation apparatus of claim 1, wherein the first rotating assembly, the first wire, and the first spring are operated independently from the second rotating assembly, the second wire, and the second spring.

4. The portable power generation apparatus of claim 1, wherein each of the first and second rotating assemblies includes:
   a reel configured to maintain a wound state of the respective wire and is rotatable according to pulling or winding of the respective wire;
   a spring cover insertion-coupled to the reel and including the respective spring embedded therein;
   a locking plate mounted on the spring cover; and
   a locking member mounted on the locking plate and insertion-coupled to the first clutch gear of the fly-wheel main body or the second clutch gear of the fly-wheel so that the fly-wheel assembly rotates in one direction.

5. The portable power generation apparatus of claim 4, wherein the locking plate includes a support protrusion that supports rotation of the locking member,
   wherein the locking member is disposed around the support protrusion, and
   wherein the locking member is insertion-coupled to the first clutch gear or the second clutch gear on a same plane as the fly-wheel main body or the fly-wheel.

6. The portable power generation apparatus of claim 4, wherein each of the first and second springs includes a spiral spring embedded in the spring cover and a spring holder into which an end portion of the shaft is inserted,
   wherein one inner end portion of the spiral spring is inserted into the spring holder, and
   wherein one outer end portion of the spiral spring is inserted into the spring cover.

7. The portable power generation apparatus of claim 6, wherein an insertion groove into which the one outer end portion of the spiral spring is inserted is formed on a circumference of the spring cover, and
   wherein a seating bed on which the one outer end portion of the spiral spring inserted through the insertion groove is seated is disposed on an outer side of the spring cover.

8. The portable power generation apparatus of claim 6, wherein the fly-wheel support is inserted into a central portion of the shaft, and
   wherein the fly-wheel support is rotatably held on the shaft by an E-ring insertion-coupled to the shaft.

9. The portable power generation apparatus of claim 6, wherein a pulling state of each of the first and second wires is controlled by an elastic force of the spiral spring.

10. The portable power generation apparatus of claim 6, wherein a plurality of protrusions are disposed on an inner side of the reel, and a plurality of grooves are formed in an outer side of the spring cover, and
    wherein each of the plurality of protrusions is inserted into one of the plurality of grooves to be integrally rotatable.

11. The portable power generation apparatus of claim 10, further comprising a cover assembly that accommodates the fly-wheel assembly, the first and second rotating assemblies, the first and second wires, and the first and second springs,
    wherein the cover assembly includes an upper cover and a lower cover that are separable.

12. The portable power generation apparatus of claim 11, wherein the spring holder includes a protrusion, and
    wherein the protrusion of the spring holder is inserted into a concave part in the cover assembly to block rotation of the spring holder.

13. The portable power generation apparatus of claim 12, wherein the power generation assembly includes a motor, a gear formed on a rotating shaft of the motor and engaged with the ring gear of the fly-wheel main body, and a motor bracket configured to mount the motor on the cover assembly.

14. A module comprising:
- a portable power generation apparatus including a fly-wheel assembly configured to be rotatable around a shaft, a first rotating assembly disposed on one side of the fly-wheel assembly and configured to rotate the fly-wheel assembly and a second rotating assembly disposed on another side of the fly-wheel assembly and configured to rotate the fly-wheel assembly, a first wire and a second wire configured to rotate the first and second rotating members, respectively, by a respective pulling operation, a first spring and a second spring configured to perform winding operations on the first and second wires, respectively, and a power generation assembly configured to generate power by rotation of the fly-wheel assembly;
- a module main body that accommodates the portable power generation apparatus;
- a bottom member that is coupled to the module main body and fixes the portable power generation apparatus; and
- a first handle and a second handle that are coupled to the first and second wires, respectively, wherein the fly-wheel assembly includes:
- a fly-wheel main body including a ring gear formed on an outer circumference thereof and a first clutch gear formed on an inner side thereof;
- a fly-wheel support seated inside the fly-wheel main body; and
- a fly-wheel coupled to the fly-wheel support and including a second clutch gear formed on an inner side thereof.

15. The module of claim 14, further comprising at least one of a battery that is mounted in the module main body and charges electricity generated by the power generation apparatus, a light emitting device connected to the battery, and a Universal Serial Bus (USB) terminal connected to the battery.

16. The module of claim 14, wherein a screw-coupled structure is disposed on an upper portion of the module main body, and
wherein the module main body is coupled to at least one of an insect/mosquito repellent device module, an emergency light module, a rescue signal apparatus module, a heater module, and a cooler module that are coupled in a screw-coupling manner.

* * * * *